Oct. 4, 1938.     G. E. TREMBLAY     2,132,060
WEATHER STRIP
Filed July 13, 1937
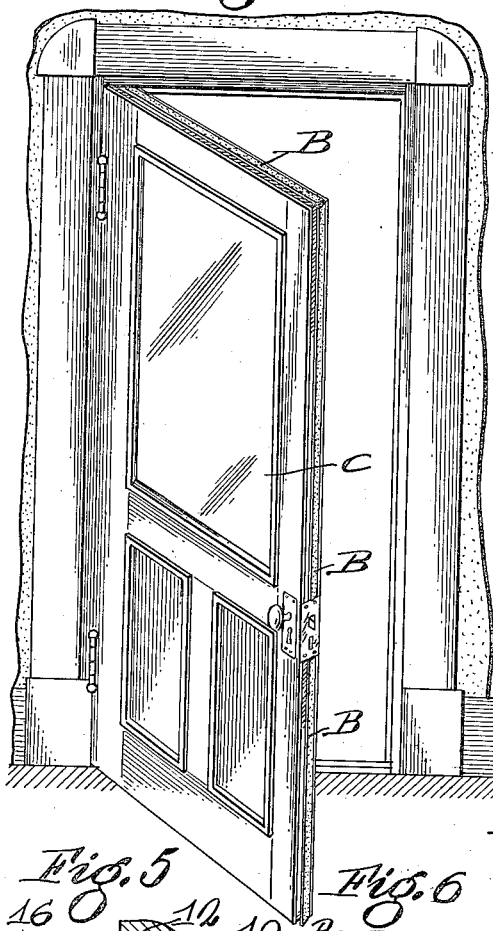
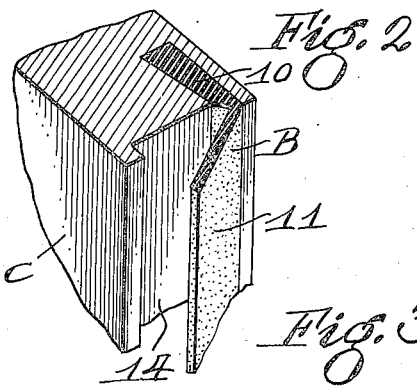
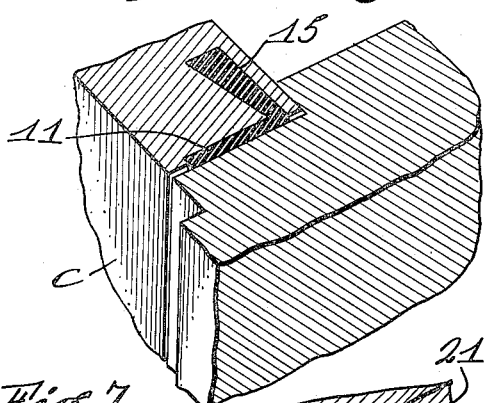
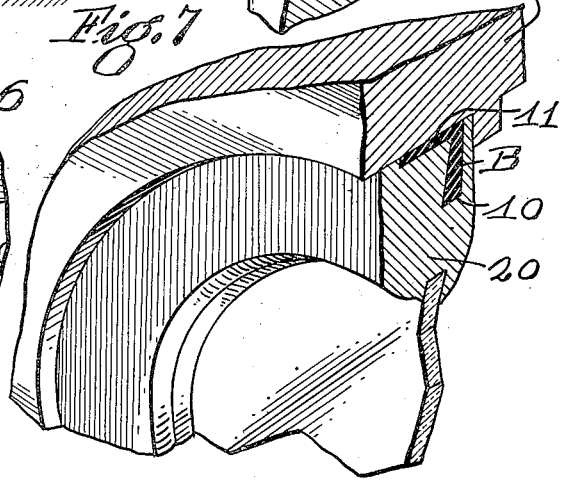
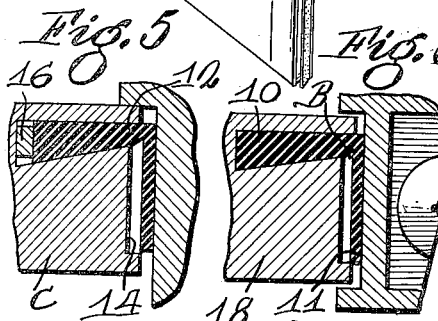
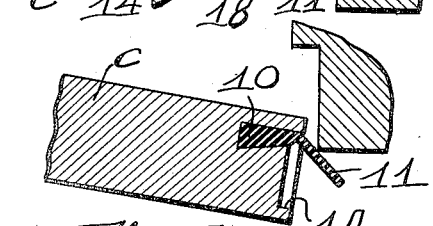
Inventor
Grégoire E. Tremblay
By Raymond A. Robic
Attorney Patented Oct. 4, 1938

2,132,060

UNITED STATES PATENT OFFICE 2,132,060

WEATHER STRIP

Gregoire Evague Tremblay, Quebec, Quebec, Canada

Application July 13, 1937, Serial No. 153,386
In Canada December 2, 1936

1 Claim. (Cl. 20—69)

The present invention relates to improvements in weather strip construction for doors, windows and similar closures.

An object of the invention is the provision of a weather strip which may be attached to a closure without the use of nails or other fastening elements.

Another object of the invention is the provision of a weather strip which may be slidably connected with a closure and may be easily mounted in position and removed.

A further object of the invention is the provision of a weather strip which may be efficiently employed on a straight as well as curved edge closures.

Still another object of the invention is the provision of a weather strip which will enable trimming or planing of the edges of a closure to correct a warped condition without removal of the weather strip.

A still further object of the invention is the provision of a weather strip of the aforesaid character which will provide a durable weather-tight joint.

Other objects and advantages of the invention will become apparent as the description progresses.

In the accompanying drawing forming a part of this specification and in which like reference characters are employed to designate corresponding parts throughout the same:—

Figure 1 is a perspective view of a door equipped with the improved weather strip structure, Figure 2 is a fragmentary perspective view showing the form of the weather strip when the door is open, Figure 3 is a similar view showing the door in fully closed position in the door frame, Figure 4 is a horizontal section showing the door in a partly closed position, Figure 5 is a similar view with the door in closed position and the weather strip projected by a filling strip, Figure 6 is a fragmentary horizontal section through the weather strip operatively connected with a window, and Figure 7 is a fragmentary perspective view showing the weather strip connected with a curved closure.

Referring to Figures 1 to 4 inclusive illustrating the application of the strip to a conventional swinging door, B generally designates the weather strip which is formed of resilient flexible material, preferably rubber. The strip B is composed of a fastening flange 10 and a sealing flange 11 preferably arranged at an obtuse angle with one another.

The fastening flange 10 of the weather strip is formed, in cross section, so that it has an increasing taper from the juncture with the sealing flange to the outer free end. At the inner or juncture end of the tapered flange 10 is formed a more abrupt short tapering portion 12 to increase the flexibility of the strip at the juncture of the flanges. The sealing flange 11 is preferably of uniform thickness in cross section from the inner to the outer edge and usually of decreased thickness relative to the complementary flange 10.

In order to properly connect the weather strip B with the desired edges of a door C, that is, the upper and lower edges as well as the free edge portion, each such edge of the door is preferably formed with a comparatively wide shallow groove or channel 14 and relatively deep narrower groove 15. The deep groove 15 is preferably formed with a taper corresponding to that of the fastening flange 10 of the weather strip, that is, having an increasing taper inwardly of the door.

To mount the weather strip B on the door it is, therefore, merely necessary to slide the same longitudinally along the edge with the tapered flange 10 engaging the deep groove in the door. When the door is open, the exterior or sealing flange 11 tends to assume an outwardly directed position, at an inclination to the edge of the door, as shown at Figure 2. When the door is closed, the exterior sealing flange 11 is bent inwardly by the frame or casing structure, so that it assumes a position approximately parallel with the edge of the door and within or partly within the wide shallow groove 14 of the door, as shown at Figure 3. Due to the flexible and resilient nature of the sealing flange, it provides, in closed position, a highly efficient weather-tight joint.

As shown at Figure 4, a partial closure of the door, that is, a closure such that the weather strip will contact with the frame, will also provide a fairly efficient weather-tight joint.

If, due to the warping of the door or some similar cause, it becomes necessary to trim or plane one or more of the edges equipped with the weather strips, such planing operation may be effected without removal of the strip, due to the peculiar connection thereof and the fact that the blade in the plane will not cut the rubber. When, due to such trimming or to partial wear of the weather strip it should no longer fit as tightly as may be desired, adjustment may be effected by inserting a filling strip 16 in the deep groove 15 of the door, that is, between the inner end of the weather strip fastening flange 10 and the inner wall of the groove, as shown at Figure 5, so as to partially project the strip transversely of the door and to cause the exterior sealing flange to more tightly engage the door frame.

As shown at Figure 6, the weather strip B may be connected in a similar manner to a sliding window sash 18, in this case the sealing flange being retained in a resilient, inwardly pressed position approximately parallel with each side edge of the sash to afford a slidable weather-tight connection.

At Figure 7 is illustrated a corresponding connection of the weather strip B in a closure, as for instance, a disc-type swinging window 20 mounted in a frame 21 providing a round window opening. Due to the flexible resilient action of the exterior sealing flange of the strip, such application thereof will also provide a highly effective weather-tight joint.

As will be readily apparent, the weather strip hereinbefore described may be quickly and easily connected to the edge of a closure and entirely obviates the necessity of employing fastening elements such as nails or screws. The tapered or flaring form of the fastening flange will securely hold the strip in proper position within the correspondingly shaped groove in the edge portion of the closure. Due to the resilient nature of the strip, and particularly the exterior sealing flange, a very efficient tight-fitting joint between the closure and its frame or casing is thus provided.

It is to be understood that the forms of my invention herein shown and described are to be taken as preferred examples of the same, and that various changes as to the shape, size and arrangement of parts may be resorted to without departing from the spirit of the invention or the scope of the subjoined claim.

Having thus described my invention, I claim:—

In a weather strip made entirely of rubber, an elongated base pad adapted to be connected with a carrier member, and a flexible flange formed integral with the base and extending angularly therefrom, the said flange being of substantially uniform thickness, said base having a thickness equal to that of the flange at their meeting point and increasing in thickness gradually from that point for a short distance and then at a more obtuse angle in order to increase the base thickness gradually to a tapered form.

GREGOIRE EVAGUE TREMBLAY.